United States Patent
Tanaka et al.

(10) Patent No.: US 10,964,485 B2
(45) Date of Patent: Mar. 30, 2021

(54) SEPARATOR FOR ALUMINUM ELECTROLYTIC CAPACITORS, AND ALUMINUM ELECTROLYTIC CAPACITOR

(71) Applicant: NIPPON KODOSHI CORPORATION, Kochi (JP)

(72) Inventors: Kosuke Tanaka, Kochi (JP); Kazuyuki Sakamoto, Kochi (JP); Atsushi Igawa, Kochi (JP); Ai Morikawa, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 0 days.

(21) Appl. No.: 16/476,132

(22) PCT Filed: Jan. 16, 2018

(86) PCT No.: PCT/JP2018/000965
§ 371 (c)(1),
(2) Date: Jul. 5, 2019

(87) PCT Pub. No.: WO2018/135471
PCT Pub. Date: Jul. 26, 2018

(65) Prior Publication Data
US 2020/0027664 A1  Jan. 23, 2020

(30) Foreign Application Priority Data

Jan. 20, 2017 (JP) .............................. JP2017-008475

(51) Int. Cl.
*H01G 9/045* (2006.01)
*H01G 4/16* (2006.01)
*H01G 9/02* (2006.01)

(52) U.S. Cl.
CPC .............. *H01G 9/045* (2013.01); *H01G 4/16* (2013.01); *H01G 9/02* (2013.01)

(58) Field of Classification Search
CPC .......... H01G 9/045; H01G 9/02; H01G 4/16; H01G 9/15; H01G 9/0032; H01G 9/028; H01G 9/04; H01G 9/07; H01G 9/012; H01G 11/48; H01G 11/60; H01B 1/127; H01B 1/22; H01B 5/14; H05K 1/092
See application file for complete search history.

(56) References Cited

U.S. PATENT DOCUMENTS

2006/0028786 A1    2/2006 Norton et al.

FOREIGN PATENT DOCUMENTS

| JP | 06168848 A | * | 6/1994 |
| JP | H06-168848 A | | 6/1994 |
| WO | 2013/141306 A1 | | 9/2013 |

OTHER PUBLICATIONS

Apr. 10, 2018 International Search Report issued in International Patent Application No. PCT/JP2018/000965.
Oct. 7, 2020 extended European Search Report issued in European Patent Application No. 18741552.6.

* cited by examiner

*Primary Examiner* — Michael P McFadden
(74) *Attorney, Agent, or Firm* — Oliff PLC

(57) ABSTRACT

Provided is a separator for aluminum electrolytic capacitors, in which the separator has both good short circuit resistance and good impedance characteristics. A separator for aluminum electrolytic capacitors is formed, in which the separator is interposed between a positive electrode and a negative electrode of an aluminum electrolytic capacitor, and the separator includes at least one layer that is formed from plant fibers and has a dielectric breakdown strength of greater than or equal to 20 kV/mm.

2 Claims, No Drawings

SEPARATOR FOR ALUMINUM ELECTROLYTIC CAPACITORS, AND ALUMINUM ELECTROLYTIC CAPACITOR

TECHNICAL FIELD

The present invention relates to a separator for aluminum electrolytic capacitors suitable for use in an aluminum electrolytic capacitor, and an aluminum electrolytic capacitor using the separator for aluminum electrolytic capacitors.

BACKGROUND ART

In general, electrolytic paper is interposed as a separator between a positive electrode aluminum foil and a negative electrode aluminum foil to produce a capacitor element, and the capacitor element is impregnated with an electrolyte and sealed, whereby an aluminum electrolytic capacitor is produced.

In the aluminum electrolytic capacitor, a main role of the separator is separation of both electrodes and retention of the electrolyte. To separate both electrodes, the separator is required to have high shielding property while having low resistance. Further, material of the separator is required to have electrical insulation, and also required to be hydrophilic and lipophilic for retaining various types of electrolytes Thus, a separator is used containing cellulose as a raw material and having these characteristics together.

For a separator for aluminum electrolytic capacitors, papermaking chemical pulp is used that is a plant fiber digested and extracted from wood or non-wood by a sulfate (kraft) method, a sulfite method, or an alkali method.

The aluminum electrolytic capacitor has features of being small, high in capacity, and inexpensive as compared to other capacitors, but there has always been a demand for increasing capacity and lowering impedance. In addition, with a background of downsizing of digital home appliances and power supplies, market demand has increased for downsizing of the aluminum electrolytic capacitor. Additionally, in recent years, demand has also become strong for downsizing of the aluminum electrolytic capacitor for the purpose of material reduction for cost reduction. To downsize the aluminum electrolytic capacitor, it is necessary to thin the separator; however, simple thinning causes increase in short circuit failure, so that a separator is required having a higher short circuit resistance to achieve thinning of the separator.

In recent years, globalization of electric and electronic devices and inverterization for energy saving have been advanced. In addition, clean energy related demand has expanded such as solar power generation and wind power generation. The aluminum electrolytic capacitors used in these devices are now required to have a voltage higher than 400 V that is higher than before. In addition, since power supply voltage of emerging countries is unstable, coping with overvoltage, which withstand a voltage higher than rated voltage, is required for aluminum electrolytic capacitors for emerging countries. To cope with a voltage of greater than or equal to 400 V and an overvoltage, a separator is required having a higher short circuit resistance.

If the thickness of the separator is increased, the short circuit resistance can be improved, but a distance increases between a positive electrode foil and a negative electrode foil, and the impedance characteristics degrades of the aluminum electrolytic capacitor.

In addition, to secure the capacity of the aluminum electrolytic capacitor, it is necessary to wind an electrode foil of a predetermined area. Then, when the separator widths are the same as each other, if a thick separator is used to secure a predetermined capacity, the diameter of the capacitor element is increased, which makes it difficult to downsize the capacitor.

Examples of an index of the short circuit resistance of the separator include dielectric breakdown strength. The dielectric breakdown strength is a value obtained by dividing a voltage when a voltage is applied to electrodes sandwiching a separator and the separator is broken and short-circuited, by the thickness of the separator. The larger the value of the dielectric breakdown strength, the higher the short circuit resistance per unit thickness of the separator.

To thin the separator and lower the impedance without reducing the short circuit resistance of the separator, or to improve the short circuit resistance of the separator without increasing the thickness, that is, without raising the impedance, it is effective to increase the dielectric breakdown strength. To increase the dielectric breakdown strength of the separator, a process is important of beating pulp that is the raw material of the separator. Beating refers to processing that mechanically processes pulp to soften, fibrillate, and refine in the presence of water.

To improve the short circuit resistance of the separator, techniques are disclosed of Patent Literature 1 and Patent Literature 2, for example.

CITATION LIST

Patent Literature

Patent Literature 1: JP 6-168848 A
Patent Literature 2: WO 2013/141306 A

SUMMARY OF INVENTION

Technical Problem

In Patent Literature 1, electrolytic paper is disclosed in which a high density layer and a low density layer are layered, where the high density layer is set to have a thickness of 10.0 to 50.0 μm and a density of 0.880 to 1.000 $g/cm^3$, and the low density layer is set to have a thickness of 10.0 to 50.0 μm and a density of 0.200 to 0.400 $g/cm^3$. By setting the density of the high density layer to 0.880 to 1.000 $g/cm^3$, the withstand voltage can be improved, and the short circuit failure rate of the aluminum electrolytic capacitor can be reduced.

However, as described above, reduction is required in short circuit failure due to a further high voltage or overvoltage of the capacitor, and further improvement is also required in the short circuit resistance of the separator.

In Patent Literature 2, a separator for a power storage device is disclosed that is a porous film having a dielectric breakdown strength Ea value of greater than or equal to 160 kV/mm and a porosity of 45 to 85%. Since a porous film mainly containing a polyolefin-based resin has a melting point, the porous film cannot be used as the separator for aluminum electrolytic capacitors that is required to have dimensional stability and chemical stability at a temperature of higher than or equal to 100° C. In addition, since the separator that is a porous film has a smaller electrolyte retaining ability than that of the separator containing cellulose as disclosed in Patent Literature 1, when used in an aluminum electrolytic capacitor, there is a possibility that the impedance of the capacitor increases, or dry-up of the electrolyte tends to occur and the life is shortened. Further, when the absolute amount of the electrolyte to be retained is small, in some cases, the electrolyte does not spread over the surface of the oxide film, the effective electrode area is reduced, and the capacitance of the aluminum electrolytic capacitor does not appear as designed.

As described above, it has been difficult to lower the impedance while improving the short circuit resistance of the capacitor.

The present invention is for solving the above-described problems, and provides a separator having both good short circuit resistance and good impedance characteristics. In addition, the present invention also provides an aluminum electrolytic capacitor that can be downsized, or enables coping with high voltage, coping with overvoltage, and the like by using the separator.

Solution to Problem

A separator for aluminum electrolytic capacitors according to the present invention is a separator for aluminum electrolytic capacitors, the separator being interposed between a positive electrode and a negative electrode of an aluminum electrolytic capacitor, the separator including at least one layer that is formed from plant fibers and has a dielectric breakdown strength of greater than or equal to 20 kV/mm.

An aluminum electrolytic capacitor of the present invention includes: a positive electrode and a negative electrode; and a separator interposed between the positive electrode and the negative electrode, in which, as the separator, a separator for aluminum electrolytic capacitors of the present invention is used.

Advantageous Effects of Invention

According to the present invention, a separator for aluminum electrolytic capacitors can be provided excellent in short circuit resistance. In addition, by using the separator, the aluminum electrolytic capacitor can be provided that can be downsized, or enables coping with high voltage, coping with overvoltage, and the like.

The separator for aluminum electrolytic capacitors of the present invention has both good short circuit resistance and good impedance characteristics. For this reason, by using the separator of the present invention, the short circuit resistance of the separator can be improved without degradation of the impedance characteristics. Alternatively, the impedance of the separator can be reduced without degradation of the short circuit resistance. Then, by using the separator of the present invention, improvement of the short circuit resistance and reduction of the impedance are enabled of the aluminum electrolytic capacitor, so that the separator can contribute to downsizing, coping with high voltage, coping with overvoltage, and lowering impedance, of the capacitor.

DESCRIPTION OF EMBODIMENTS

Hereinafter, an embodiment example of the present invention will be described in detail.

A separator for aluminum electrolytic capacitors of the present invention includes at least one layer that is formed from plant fibers and has a dielectric breakdown strength of greater than or equal to 20 kV/mm.

In addition, an aluminum electrolytic capacitor of the present invention includes: a positive electrode and a negative electrode; and a separator interposed between the positive electrode and the negative electrode, in which, as the separator, a separator for aluminum electrolytic capacitors of the present invention is used.

The plant fiber used in the present invention is not particularly limited, and any fiber can be used, and wood pulp or non-wood pulp are suitably used, for example.

These pulps and fibers may be bleached, or may be ones purified such as dissolving pulp, or may be mercerized pulp.

As wood pulps, it is possible to use conifers such as spruce, fir, pine, and hemlock, and broadleaved trees such as beech, oak, birch, and eucalyptus.

As non-wood pulp, it is possible to use: vein fibers such as manila hemp, sisal hemp, banana, and pineapple; bast fibers such as paper mulberry, Edgeworthia papyrifera, Diplomorpha sikokiana, jute, kenaf, hemp, and flax; Gramineae plant fibers such as esparto, bamboo, bagasse, straw, and reed; seed hair fibers such as cotton, linters, and kapok; fruit fibers such as palm; and various other plants such as soft rush and sabai grass.

In addition, these materials may be used in one type or in mixture of two or more types.

The plant fibers used in the present invention need to be subjected to beating processing. For the beating processing, beating machines used for preparation of a papermaking raw material can be used without particular limitation, such as a disc refiner, a conical refiner, a high pressure homogenizer, and a beater.

In these plant fibers containing cellulose, hydrogen bonds are formed in the fibers and between the fibers, and the fibers are bound together, whereby denseness of a sheet is improved. In the beaten plant fibers, the fibers are made finer, and this tendency is further enhanced, so that the fibers adhere to each other not by points but by lines or surfaces, and a denser sheet can be formed.

When fibers other than plant fibers are used, such as synthetic fibers, the hydrogen bond of cellulose is inhibited, and the denseness of the sheet is reduced. In addition, even in the case of cellulose fibers, a chemical fiber such as rayon is hard compared to the above-described plant fibers, so that adhesion is weak between the fibers, and the short circuit resistance is reduced of the separator.

For example, wet nonwoven fabric is formed using a papermaking method, whereby the separator of the present invention can be formed.

The papermaking type of the separator is not particularly limited as long as the dielectric breakdown strength can be satisfied, and papermaking types can be used, such as Fourdrinier papermaking, tanmo papermaking, or cylinder papermaking. Among these papermaking types, Fourdrinier papermaking can further improve the denseness of the separator.

However, as long as the dielectric breakdown strength of the present invention is satisfied, the method of forming the layers constituting the separator is not limited, and it is not limited to the papermaking method.

In addition, the separator of the present invention may further include another layer if the layer has a dielectric breakdown strength of greater than or equal to 20 kV/mm. Regarding the other layer, there is no particular limitation on the constituent fibers and the dielectric breakdown strength as long as a function as the separator is not inhibited. In addition, in sheet formation of the separator of the present invention, additives may be added such as a dispersing agent, an antifoaming agent, and a paper strengthening agent as long as the impurity content does not affect the separator for capacitors.

Further, the separator of the present invention may be subjected to post-processing such as paper strengthening processing, lyophilic processing, calendering, embossing after the sheet formation as long as the dielectric breakdown strength is satisfied.

The separator of the present invention includes at least one layer having a dielectric breakdown strength of greater than or equal to 20 kV/mm. If the dielectric breakdown strength is greater than or equal to 20 kV/mm, a separator is made having excellent short circuit resistance, the separator being able to contribute to downsizing, coping with high voltage, coping with overvoltage, and the like of the aluminum electrolytic capacitor. Then, the separator having high short circuit resistance also enables thinning of the separator, and can also contribute to reduction of the impedance.

From a viewpoint of short circuit resistance, the dielectric breakdown strength is preferably as high as possible, but practically it is considered that the upper limit is about 100 kV/mm. To make the dielectric breakdown strength greater than 100 kV/mm, it is necessary to significantly progress refinement of the plant fiber, but it may be difficult to form a separator with an excessively refined plant fiber.

Note that, the dielectric breakdown strength is a value obtained by dividing a voltage (dielectric breakdown voltage) when a voltage is applied to electrodes sandwiching a separator and the separator is broken and short-circuited, by the thickness of the separator, and is used as an index for measuring short circuit resistance per unit thickness of the separator.

When the dielectric breakdown strength is less than 20 kV/mm, it can be said that the dielectric breakdown voltage of the separator is too low compared to the thickness, or the thickness is too thick compared to the dielectric breakdown voltage of the separator. In other words, when the dielectric breakdown strength is less than 20 kV/mm, the separator cannot be made thinner than a certain level to satisfy the short circuit resistance of the separator, and it becomes difficult to reduce the impedance, or the separator cannot be made thicker than a certain level to satisfy a desired impedance, and it becomes difficult to improve the short circuit resistance of the separator.

The thickness of the separator is preferably 10 to 80 μm. By making a separator including a layer having a thickness of 10 to 80 μm and a dielectric breakdown strength of greater than or equal to 20 kV/mm, the separator can be made to have both good short circuit resistance and good impedance characteristics.

When the thickness is less than 10 μm, it may be difficult to reduce the short circuit failure of the capacitor even with the separator of the present invention having good short circuit resistance. When the thickness exceeds 80 μm, it may be difficult to lower the impedance of the capacitor even with the separator of the present invention having good impedance characteristics.

The density of the separator generally used is about 0.60 to 1.00 $g/cm^3$.

In addition, in a multilayer separator, in some cases, a separator is used having a density of less than 0.60 $g/cm^3$ as a whole by combining a layer of about 0.60 to 1.00 $g/cm^3$ with a layer having a lower density; however, in the separator of the present invention, the density of the separator is not particularly limited as long as the dielectric breakdown strength is satisfied.

For example, by making the freeness 0 to 300 ml measured in accordance with JIS P8121 [Pulps-Determination of drainability-Part 2: "Canadian Standard" freeness method] except that an 80 mesh wire mesh having an opening ratio of 31.3% is used and the sample concentration is 0.15 mass %, the separator of the present invention can be obtained having a dielectric breakdown strength of greater than or equal to 20 kV/mm.

As an index of the degree of beating of fibers, a Canadian standard freeness is generally used that is measured in accordance with "JIS P 812 1-2 Pulps-Determination of drainability-Part 2: Canadian Standard freeness method". The Canadian standard freeness is a volume of drainage collected from a side orifice of a Canadian standard freeness tester, expressed in ml. Specifically, the amount of drainage is measured that passes through a fiber mat formed on a sieve plate including 97 holes having a diameter of 0.5 mm per 1 $cm^2$, and is drained from the side orifice in the measuring funnel.

The fibers are refined by beating. Since drainability is reduced in the refined fiber, the value of the Canadian standard freeness decreases as the beating progresses, and reaches 0 ml. When the beating is further progressed, fine fibers passing through the sieve plate holes increase, and the value of the freeness turns to rise.

In other words, the Canadian standard freeness is not appropriate as an index for evaluating drainability of highly beaten fibers. To measure an accurate freeness, it is necessary to use a fine mesh to capture the refined fiber. Further, since drainability is further degraded when the fine mesh is used, it is necessary to set the sample concentration low to obtain an adequate drainage rate.

Thus, in the embodiment example of the present invention, to measure the accurate freeness, a 0.15% freeness is used measured in accordance with JIS P8121-2 except that the 80 mesh wire mesh having the opening ratio of 31.3% is used and the sample concentration is 0.15 mass %.

When the value of the 0.15% freeness is greater than 300 ml, the degree of refinement of the fiber is low, so that a dense paper layer cannot be formed and the dielectric breakdown strength may be less than 20 kV/mm. In addition, even in the case of the 0.15% freeness, when the beating is highly progressed, the number of fine fibers passing through the sieve plate holes may increase, and the value of the freeness may turn to rise. In fibers that are highly beaten and whose value of the 0.15% freeness is turned to rise and become greater than 300 ml, problems occur such as a decrease in a yield on the wire of the raw material at the time of papermaking, and a significant reduction in productivity due to a decrease in drainage rate, so that the fibers are not suitable for the separator of the present invention.

As described above, in the embodiment example of the present invention, the freeness is used as an index of the refinement of the fiber; however, the implementation means is not particularly limited as long as the dielectric breakdown strength of the present invention can be satisfied, and it is not limited to the above-described freeness. In addition, the concentration of the sample for measuring the freeness, and the mesh of the wire for measuring the freeness are not particularly limited.

It has been found that the configuration of the above separator can provide an aluminum electrolytic capacitor excellent in short circuit resistance.

EXAMPLES

Hereinafter, various specific examples and comparative examples will be described in detail of the separator for aluminum electrolytic capacitors according to the present invention and the aluminum electrolytic capacitor including the separator for aluminum electrolytic capacitors.

Method of Measuring Characteristics of Separator and Aluminum Electrolytic Capacitor The specific measurement of characteristics of the separator and the aluminum electrolytic capacitor of the present embodiment was performed on the following conditions and methods.

Thickness

The thickness of the separator was measured by using a micrometer of "5.1.1 Measuring instrument and measuring method a) The case of using outside micrometer" defined in "JIS C 2300-2 'Cellulosic papers for electrical purposes-Part 2: Methods of test' 5.1 Thickness", by a method of folding on 10 sheets of "5.1.3 The case measuring thickness by folding paper".

Density

The density of the separator in the bone dry condition was measured by a method defined in Method B of "JIS C 2300-2 'Cellulosic papers for electrical purposes-Part 2: Methods of test' 7.0A Density".

Average Fiber Length

The average fiber length is a value of the length weighted average fiber length measured by using a fiber length measurement apparatus (Kajaani FiberLab V4 (made by Metso Automation)) in accordance with JIS P 8226-2 'Pulps-Determination of fibre length by automated optical analysis-Part 2: Unpolarized light method' (ISO 16065-2 'Pulps-Determination of Fibre length by automated optical analysis-Part 2: Unpolarized light method').

Mode Value in Fiber Length Distribution of Every 0.05 mm

The mode value in the fiber length distribution of every 0.05 mm is a value having the highest frequency in the fiber length distribution of every 0.05 mm obtained in the average fiber length measurement.

0.15% Freeness

Measurement was performed in accordance with JIS P8121 [Pulps-Determination of drainability-Part 2: "Canadian Standard" freeness method] except that the 80 mesh wire mesh having the opening ratio of 31.3% is used and the sample concentration is 0.15 mass %.

Dielectric Breakdown Strength

The dielectric breakdown strength of the separator was measured in accordance with a method specified in "JIS C 2300-2 'Cellulosic papers for electrical purposes-Part 2: Methods of test' 24 Dielectric breakdown strength 24.2.2 The case of direct current Method B".

Production of Aluminum Electrolytic Capacitor Using Separator

Hereinafter, a method will be described of producing the aluminum electrolytic capacitor using the separator of the present embodiment example.

The separator of the present embodiment was interposed between a positive electrode foil and a negative electrode foil, and was wound, whereby an aluminum electrolytic capacitor element was obtained. The element was housed in a cylindrical aluminum case with a bottom, and an electrolyte was injected and vacuum impregnation was performed, and then sealing was performed with a sealing rubber, whereby an aluminum electrolytic capacitor was produced.

Short Circuit Failure Rate

The short circuit failure rate was a percentage obtained by counting the number of short circuits of a wound element before electrolyte impregnation and the number of short circuit failures during aging of the winding element by using the produced capacitor element, and dividing the number of elements of these short circuit failures by the number of elements wound without breakage failure.

Impedance

The impedance of the produced aluminum electrolytic capacitor was measured by using an LCR meter at a frequency of 1 kHz at 20° C.

Example 1

A separator of Example 1 was obtained by using a raw material obtained by beating softwood unbleached kraft pulp with a disc refiner, and performing Fourdrinier papermaking.

The separator had a thickness of 30 μm, a density of 0.75 g/cm$^3$, an average fiber length of 1.95 mm, a mode value of 0.40 mm in the fiber length distribution of every 0.05 mm, a 0.15% freeness of 280 ml, and a dielectric breakdown strength of 21 kV/mm.

By using the separator, as an aluminum electrolytic capacitor of Example 1, an aluminum electrolytic capacitor was produced having a rated voltage of 250 V, a rated capacity of 47 μF, a diameter of 12.5 mm, and a height of 20.0 mm. The short circuit failure rate of the aluminum electrolytic capacitor was 0.1%, and the impedance was 1.5Ω.

Example 2

A separator of Example 2 was obtained by using a raw material obtained by beating softwood TCF bleached kraft pulp with a disc refiner, and performing Fourdrinier papermaking.

The separator had a thickness of 20 μm, a density of 1.00 g/cm$^3$, an average fiber length of 0.37 mm, a mode value of 0.20 mm in the fiber length distribution of every 0.05 mm, a 0.15% freeness of 270 ml (a value after the beating was further progressed from 0 ml and turned to rise), and a dielectric breakdown strength of 96 kV/mm.

By using the separator, as an aluminum electrolytic capacitor of Example 2, an aluminum electrolytic capacitor was produced having a rated voltage of 250 V, a rated capacity of 47 μF, a diameter of 12.0 mm, and a height of 20.0 mm. In the aluminum electrolytic capacitor, no short circuit failure occurred. In addition, the impedance was 1.4Ω.

Comparative Example 1

A separator of Comparative Example 1 was obtained by using a raw material obtained by beating softwood unbleached kraft pulp with a disc refiner, and performing Fourdrinier papermaking.

The separator had a thickness of 40 μm, a density of 0.90 g/cm³, an average fiber length of 2.08 mm, a mode value of 0.60 mm in the fiber length distribution of every 0.05 mm, a 0.15% freeness of 315 ml, and a dielectric breakdown strength of 17 kV/mm.

By using the separator, as an aluminum electrolytic capacitor of Comparative Example 1, an aluminum electrolytic capacitor was produced having a rated voltage of 250 V, a rated capacity of 47 μF, a diameter of 13.0 mm, and a height of 20.0 mm. The short circuit failure rate of the aluminum electrolytic capacitor was 3.3%, and the impedance was 2.0Ω.

Comparative Example 2

A separator of Comparative Example 2 was obtained by mixing softwood unbleached kraft pulp beaten with a disc refiner and solvent-spun cellulose fibers beaten with a disc refiner at a ratio of 2:1, and performing Fourdrinier papermaking.

The separator had a thickness of 40 μm, a density of 0.65 g/cm³, an average fiber length of 1.65 mm, a mode value of 0.30 mm in the fiber length distribution of every 0.05 mm, a 0.15% freeness of 50 ml, and a dielectric breakdown strength of 15 kV/mm.

By using the separator, as aluminum electrolytic capacitor of Comparative Example 2, an aluminum electrolytic capacitor was produced having a rated voltage of 250 V, a rated capacity of 47 μF, a diameter of 13.0 mm, and a height of 20.0 mm. The short circuit failure rate of the aluminum electrolytic capacitor was 14.5%, and the impedance was 1.8Ω.

Conventional Example

A commercially available porous film was used as a separator of Conventional Example. The separator had a thickness of 20 μm, a density of 0.40 g/cm³, and a dielectric breakdown strength of 170 kV/mm.

By using the separator, as an aluminum electrolytic capacitor of Conventional Example, an aluminum electrolytic capacitor was produced having a rated voltage of 250 V, a rated capacity of 47 μF, a diameter of 12.0 mm, and a height of 20.0 mm. In the aluminum electrolytic capacitor, no short circuit failure occurred. In addition, the impedance was 4.2Ω.

Example 3

A separator of Example 3 was obtained by using a Fourdrinier cylinder combination paper machine, and performing papermaking with a raw material obtained by mixing Manila hemp pulp and hemp pulp in a ratio of 1:1 and beating the pulp with a disc refiner, in the Fourdrinier section, and performing papermaking with a raw material obtained by mixing Manila hemp pulp and hemp pulp at a ratio of 1:1 and lightly beating the pulp with a disc refiner, in the cylinder section, and combining the papermakings together.

The separator was formed from two layers of a Fourdrinier layer and a cylinder layer, and had a thickness of 50 μm and a density of 0.72 g/cm³ in the separator as a whole. The Fourdrinier layer had a thickness of 20 μm, a density of 0.85 g/cm³, an average fiber length of 0.86 mm, a mode value of 0.30 mm in the fiber length distribution of every 0.05 mm, a 0.15% freeness of 10 ml, and a dielectric breakdown strength of 49 kV/mm. The cylinder layer had a thickness of 30 μm, a density of 0.63 g/cm³, an average fiber length of 2.10 mm, a mode value of 2.42 mm in the fiber length distribution of every 0.05 mm, a 0.15% freeness of 730 ml, and a dielectric breakdown strength of 13 kV/mm.

By using the separator, as an aluminum electrolytic capacitor of Example 3, an aluminum electrolytic capacitor was produced having a rated voltage of 450 V, a rated capacity of 3.3 μF, a diameter of 12.5 mm, and a height of 20.0 mm. The short circuit failure rate of the aluminum electrolytic capacitor was 0.2%, and the impedance was 20.5Ω.

Comparative Example 3

A separator of Comparative Example 3 was obtained by using a Fourdrinier cylinder combination paper machine, and performing papermaking with a raw material obtained by beating softwood unbleached kraft pulp with a disc refiner, in the Fourdrinier section, and performing papermaking with a raw material obtained by lightly beating softwood unbleached kraft pulp with a disc refiner, in the cylinder section, and combining the papermakings together.

The separator was formed from two layers of a Fourdrinier layer and a cylinder layer, and had a thickness of 60 μm and a density of 0.53 g/cm³ in the separator as a whole. The Fourdrinier layer had a thickness of 30 μm, a density of 0.70 g/cm³, an average fiber length of 2.11 mm, a mode value of 2.00 mm in the fiber length distribution of every 0.05 mm, a 0.15% freeness of 380 ml, and a dielectric breakdown strength of 17 kV/mm. The cylinder layer had a thickness of 30 μm, a density of 0.36 g/cm³, an average fiber length of 2.60 mm, a mode value of 3.03 mm in the fiber length distribution of every 0.05 mm, a 0.15% freeness of 750 ml, and a dielectric breakdown strength of 10 kV/mm.

By using the separator, as an aluminum electrolytic capacitor of Comparative Example 3, an aluminum electrolytic capacitor was produced having a rated voltage of 450 V, a rated capacity of 3.3 μF, a diameter of 13.0 mm, and a height of 20.0 mm. The short circuit failure rate of the aluminum electrolytic capacitor was 5.2%, and the impedance was 46.6Ω.

Table 1 indicates evaluation results of the separator alone and the capacitor of a rated voltage of 250 V of each of Examples 1 to 2, Comparative Examples 1 to 2, and Conventional Example. In addition, Table 2 indicates evaluation results of the separator alone and the capacitor of a rated voltage of 450 V of each of Example 3 and Comparative Example 3.

TABLE 1

| | Thickness μm | Density g/cm³ | Average fiber length mm | Fiber length mode value mm | 0.15% freeness ml | Dielectric breakdown strength kV/mm | Rated voltage V | Short circuit failure rate % | Impedance Ω |
|---|---|---|---|---|---|---|---|---|---|
| Example 1 | 30 | 0.75 | 1.95 | 0.40 | 280 | 21 | 250 | 0.1 | 1.5 |
| Example 2 | 20 | 1.00 | 0.37 | 0.20 | ↑ 270 | 96 | 250 | 0 | 1.4 |

TABLE 1-continued

|  | Thickness μm | Density g/cm³ | Average fiber length mm | Fiber length mode value mm | 0.15% freeness ml | Dielectric breakdown strength kV/mm | Rated voltage V | Short circuit failure rate % | Impedance Ω |
|---|---|---|---|---|---|---|---|---|---|
| Comparative Example 1 | 40 | 0.90 | 2.08 | 0.60 | 315 | 17 | 250 | 3.3 | 2.0 |
| Comparative Example 2 | 40 | 0.65 | 1.65 | 0.30 | 50 | 15 | 250 | 14.5 | 1.8 |
| Conventional Example | 20 | 0.40 | — | — | — | 170 | 250 | 0.0 | 4.2 |

TABLE 2

| | | Thickness μm | Density g/cm³ | Average fiber length mm | Fiber length mode value mm | 0.15% freeness ml | Dielectric breakdown strength kV/mm | Rated voltage V | Short circuit failure rate % | Impedance Ω |
|---|---|---|---|---|---|---|---|---|---|---|
| Example 3 | Fourdrinier cylinder two layers | 50 | 0.72 | | | | 28 | 450 | 0.2 | 20.5 |
| | Fourdrinier layer | 20 | 0.85 | 0.86 | 0.30 | 10 | 49 | | | |
| | Cylinder layer | 30 | 0.63 | 2.10 | 2.42 | 730 | 13 | | | |
| Comparative Example 3 | Fourdrinier cylinder two layers | 60 | 0.53 | | | | 15 | 450 | 5.2 | 46.6 |
| | Fourdrinier layer | 30 | 0.70 | 2.11 | 2.00 | 380 | 17 | | | |
| | Cylinder layer | 30 | 0.36 | 2.60 | 3.03 | 750 | 10 | | | |

The separator of Comparative Example 1 has the thickness and density of the high density layer described in Patent Literature 1, but the short circuit failure rate is high as compared with Examples 1 and 2. From a comparison of Example 1 and Example 2 with Comparative Example 1, it can be seen that the dielectric breakdown strength is required to be greater than or equal to 20 kV/mm.

The separator of Comparative Example 2 contains solvent-spun cellulose fibers in addition to plant fibers. For this reason, it is considered that the dielectric breakdown strength is weakened and the short circuit failure rate of the capacitor became higher. From this, it can be seen that the separator only formed from plant fibers can have a higher dielectric breakdown strength than that of a separator also containing other fibers other than plant fibers.

The separator of Conventional Example is a separator having very high dielectric breakdown strength, but the impedance of the capacitor is high as compared with Examples 1 and 2. This is considered to be the reason that the retaining ability of the electrolyte is small because the separator contains a polyolefin-based resin having low lyophilic property compared to cellulose.

The separator of Comparative Example 3 does not include a layer having a dielectric breakdown strength of greater than or equal to 20 kV/mm. For this reason, the short circuit failure rate is high despite being thicker than the separator of Example 3. From this, it can be seen that by setting the dielectric breakdown strength to greater than or equal to 20 kV/mm, thinning of the separator is enabled, and eventually, the separator can contribute to downsizing of the capacitor.

As described above, according to the present embodiment, the separator for aluminum electrolytic capacitors excellent in short circuit resistance can be provided by including at least one layer that is formed from plant fibers and has a dielectric breakdown strength of greater than or equal to 20 kV/mm.

By using the above-described separator, the aluminum electrolytic capacitor can be provided that can be downsized, or enables coping with high voltage, coping with overvoltage, and the like.

In the above, the example has been described in which the separator of the present embodiment is used for the aluminum electrolytic capacitor.

Although descriptions are omitted of details of other configurations of the aluminum electrolytic capacitor and manufacturing methods, in the aluminum electrolytic capacitor of the present invention, the electrode material and the electrolyte material do not need to be particularly limited, and various materials can be used. In addition, as long as the element outer diameter allows, it is also possible to use a plurality of the separators of the present invention layered, or a plurality of separators layered using one or a plurality of the separators of the present invention.

The invention claimed is:

1. A separator for aluminum electrolytic capacitors, the separator being interposed between a positive electrode and a negative electrode of an aluminum electrolytic capacitor, the separator comprising
    at least one layer that is formed from plant fibers and has
        a dielectric breakdown strength of greater than or equal to 21 kV/mm,
        an average fiber length in a range from 0.37 mm to 1.95 mm,
        a mode value of a fiber length distribution of every 0.05 mm being in a range from 0.20 mm to 0.40 mm, and
        a 0.15% freeness that is less than or equal to 300 ml.
2. An aluminum electrolytic capacitor comprising:
    a positive electrode and a negative electrode; and
    a separator interposed between the positive electrode and the negative electrode, wherein
    as the separator, a separator for aluminum electrolytic capacitors according to claim 1 is used.

* * * * *